United States Patent
Villamizar

(10) Patent No.: US 8,929,366 B2
(45) Date of Patent: Jan. 6, 2015

(54) METHOD AND APPARATUS FOR TRANSPORTING PACKETS WITH SPECIFIC TRAFFIC FLOWS HAVING STRICT PACKET ORDERING REQUIREMENTS OVER A NETWORK USING MULTIPATH TECHNIQUES

(75) Inventor: Curtis Villamizar, South Orleans, MA (US)

(73) Assignee: Infinera Corporation, Sunnyvale, CA (US)

(*) Notice: Subject to any disclaimer, the term of this patent is extended or adjusted under 35 U.S.C. 154(b) by 526 days.

(21) Appl. No.: 13/169,516

(22) Filed: Jun. 27, 2011

(65) Prior Publication Data

US 2012/0327941 A1     Dec. 27, 2012

(51) Int. Cl.
| | |
|---|---|
| H04L 12/28 | (2006.01) |
| H04L 12/56 | (2006.01) |
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/891 | (2013.01) |
| H04L 12/723 | (2013.01) |
| H04L 12/801 | (2013.01) |
| H04L 12/803 | (2013.01) |

(52) U.S. Cl.
CPC ............ H04L 45/50 (2013.01); H04L 47/41 (2013.01); H04L 47/125 (2013.01); Y02B 60/33 (2013.01); H04L 47/34 (2013.01)
USPC ........ 370/389; 370/394; 370/395.5; 370/231; 370/235; 370/218

(58) Field of Classification Search
CPC ....... H04L 12/56; H04L 47/34; H04L 1/1841; H05L 49/9057
USPC ..................... 370/389, 394, 395.5
See application file for complete search history.

(56) References Cited

U.S. PATENT DOCUMENTS

2003/0053464 A1* 3/2003 Chen et al. .................... 370/400
2006/0251074 A1* 11/2006 Solomon ....................... 370/392

OTHER PUBLICATIONS

Frost et al (MPLS Internet-Draft "MPLS Transport Profile Data Plane Architecture draft-ietf-mpls-tp-data-plane-04"; Jul. 1, 2010).*

*Primary Examiner* — Shaq Taha
*Assistant Examiner* — Kodzovi Acolatse
(74) *Attorney, Agent, or Firm* — Dunlap Codding P.C.; David L. Soltz

(57) ABSTRACT

The method that is disclosed enables specific information network traffic flows to retain packet ordering in a packet network in which multipath techniques are used. In a common network usage a plurality of traffic flows may be aggregated into a larger traffic flow. In such a situation, a finest granularity of individual traffic flow is referred to as a microflow and an aggregation of traffic flows is referred to as a traffic aggregate. The traffic aggregate may take a path from an ordered set of nodes including a first network element referred to as an ingress node through zero or more intermediate network elements referred to as midpoint nodes, to a final network known as the egress node. The ordered set of nodes traversed by such a traffic aggregate is referred to as the path taken by that traffic flow. At any node prior to the egress, the traffic aggregate may be split among multiple links or lower layer paths in reaching the next node in the path. In such a circumstance, the traffic aggregate is split among the available links or lower layer paths. Techniques for splitting traffic are collectively referred to as multipath techniques, or more briefly as multipath. Individual links or lower layer paths within a multipath are referred to as component links. Individual traffic flows may be identified by various existing multipath techniques. A set of existing multipath techniques are able to keep all packets within a given microflow on the same component link. The method disclosed allows specific traffic aggregates within a larger traffic aggregate to be carried on a single component link while allowing other traffic aggregates within the larger traffic aggregate to be spread among multiple component links.

4 Claims, 9 Drawing Sheets

INTERNET PROTOCOL VERSION 4 (IPv4) AS SPECIFIED IN RFC 791

PSEUDO-WIRE (PW) CONTROL WORD (CW) AS SPECIFIED IN RFC 4385

METHOD AND APPARATUS FOR TRANSPORTING PACKETS WITH SPECIFIC TRAFFIC FLOWS HAVING STRICT PACKET ORDERING REQUIREMENTS OVER A NETWORK USING MULTIPATH TECHNIQUES

FIELD OF DISCLOSURE

The inventive concept disclosed herein generally relates to a method and apparatus for transporting data flows over electrical or optical information networks which make use of multipath techniques, and more particularly but not by way of limitation, to a method and apparatus for transporting packets while retaining the order of the packets for traffic aggregates contained within larger traffic aggregates.

BACKGROUND

Information networks are well known in the art and function to transmit information such as computer data between various computer systems operably coupled to the information network.

One example of a packet-switched network is defined by the IEEE 802 standards, including the set of standards within IEEE 802 commonly known as Ethernet. These standards have found widespread acceptability and many networks conform to these standards.

Packet switched networks are distinguished from other multiplexing techniques in that each packet header is inspected to determine where to forward the packet to in order to transmit the packet closer to its final destination.

A second example is a purely circuit-switched network which operates by creating, maintaining and transmitting data over a circuit between two network nodes. Circuit switched networks may use Time Division Multiplexing (TDM) in which case such a circuit has a fixed bandwidth which poses many disadvantages.

Packet networks make use of data plane protocols which constitute an agreement among parties regarding the encapsulation or modulation of information. At the lowest physical layer protocols define the modulation or electrical or optical signals. At slightly higher layer protocols layers define bit patterns used to identify the beginning and end of packets. At this layer and at higher layers protocols encode information related to the delivery of information across highly complex networks.

Communication networks whether communicating between computers within a single building, or communicating between two metropolitan areas, e.g., San Francisco and New York are formed by a plurality of interconnected network elements. The network elements and interconnection between elements are commonly referred to using a slight variation on graph theory terminology. Network elements are referred to as "nodes". Interconnections between network elements are referred to as "links". In the mathematical discipline of graph theory the term "edge" is used where in information network the term "link" is used.

In information networking the term "edge" is used to indicate part of a network immediately adjacent to one or more "end systems", where the "end system" transmits and receives packets for their own use but do not forward packets for the benefit of other nodes in the network. In many modern networks all nodes both transmit packets and receive packets that are used for their own purpose. The term end system indicates that the sole purpose of a given node or set of nodes in a network is to use the services of the network rather than provide services. For example, the primary purpose of the core of a network is to forward large volumes of traffic for the benefit of other nodes. The primary purpose of the edge of a network is to deliver traffic to end systems. End systems only source and sink traffic.

Date plane protocols are used to facilitate the delivery of data from one computer or end system in a network to another. Date plane protocols generally place information immediately preceding the data to be delivered. The data to be delivered is known as the payload. The information placed in front of the payload is known as the packet header. The packet header generally carries information regarding where and how to deliver the packet. The payload may be followed by other information defined by the protocol, such as a frame check sequence to insure the integrity of the header and payload. The entire packet definition dictated by a particular protocol is known as that protocol's encapsulation.

A packet may be encapsulated by a computer transmitting the packet into a large network with information about the final delivery of the packet. A series of related packets sent between two end systems is a type of traffic flow known in IETF terminology as a "microflow" and in IEEE 802.1-AX terminology as a "conversation".

One type of network is referred to as a "packet network". A key requirement of a packet network is to deliver information from one computer or end system in the network, to another as directed by a specific protocol. Modern networks carry millions, if not billions of individual microflows at any given time, where the microflows are tiny in capacity relative to the capacity of the network and are extremely short lived.

Within the core of a communications network it is useful to forward large traffic aggregates rather than forward individual microflows. The Internet Protocol (IP) for example, supports this directly in its method of address allocation. A full IP address is 32 bits in IP Version 4 (IPv4) and 128 bits in IP Version 6 (IPv6). A set of higher order bits can be used to forward a traffic aggregate. For example, a trading station in the San Francisco financial district may exchange packets with a server operated by a stock exchange in the New York financial district. The full IP addresses identify the end systems. A smaller number of bits in the address may identify the address as falling within the New York metropolitan region. Additional bits used within the New York metropolitan region only might identify the destination as belonging to a particular stock exchange on Wall Street. Once delivered to the exchange, the full address can then be used to reach the specific server. This form of addressing is defined in the IETF as Classless Interdomain Routing (CIDR).

Some protocols make use of further encapsulations when aggregating traffic. Multiprotocol Label Switching (MPLS) is one such protocol. Ethernet Provider Bridging is another such protocol. For example, within the network in the San Francisco Bay area, a node may further encapsulate all traffic destined to the New York metropolitan area with an MPLS header, which in MPLS is called a label stack, or if the packet is already encapsulated as MPLS, add one or more label stack entries.

In many protocols further encapsulations can be added in order to form larger traffic aggregates. Forming larger traffic aggregates reduces the amount of control information exchanged and reduces the number of forwarding entries required deep in the core of a network. Each encapsulation is referred to as a layer of encapsulation. In some circles additional MPLS label stack entries are referred to as sub-layers, but the sub-layer terminology will not be used herein.

The outside encapsulations are transmitted first. In MPLS the outer encapsulation is also referred to as the top label stack entry or top of the label stack. Inner MPLS encapsulations are referred to as lower label stack entries and are referred to as residing below the upper label stack entries. This use of "upper" and "lower" in describing label stack entries conflicts with the use of "upper" and "lower" in describing more general layering.

In many cases more than one link may interconnect a pair of nodes. In other cases, more than one indirect path at a lower layer may be available between a pair of nodes involving one or more intermediate nodes. In many cases it is desirable to spread traffic over one or more direct links, or one or more lower layer paths when forwarding large traffic aggregates across a network.

A number of techniques involve spreading the traffic flows across multiple links or multiple lower layer paths. Collectively these solutions are called multipath techniques. A set of individual links or individual lower layer paths over which a multipath technique operates is called a multipath. Each of the individual links or individual lower layer paths is called a component of the multipath. A term which is roughly synonymous with multipath is composite link, however the two are not quite equivalent.

A common and well documented set of techniques use a hash function applied over information in packet headers as a basis for distributing traffic across the set of links in a multipath. These techniques commonly search for the innermost encapsulation which can practically be identified, such that the largest number of generally small flows or microflows can provide input to the hash, thereby providing a greater probability of an even distribution of traffic. Some multipath techniques support making adjustments to correct slight imbalance in traffic among the component links or lower layer paths. Using information at the innermost encapsulation where the least amount of traffic aggregation has occurred allows a very fine granularity to make adjustments in load balance for those techniques that support this form of adjustment.

MPLS-TP is a restricted subset of MPLS intended to provide capabilities and management that is more similar to transport network operators who are likely to be familiar with the operation of legacy TDM networks. MPLS-TP has placed new requirements on the underlying server layer. Among these requirements are that traffic within an MPLS-TP traffic flow cannot be reordered. This requirement is in conflict with the behavior of existing multipath techniques.

Existing multipath techniques include but are not limited to the following three examples.

1. ECMP—Equal cost multipath (ECMP) has been applied to IP networks since the 1980s. ECMP is defined for the IETF OSPF protocol and for the ISIS protocol, among others.

2. Ethernet Link Aggregation—The IEEE has defined 802.1AX 2010. This is a form of multipath to be applied exclusively to Ethernet.

3. MPLS Link Bundling refers to an MPLS technique which allows multiple links or lower layer paths between a pair of MPLS label switched routers to be announced in a link state routing protocol as a single Label Switched Router forwarding adjacency (link). Any one link or lower layer path in a link bundle is referred to as a component of the link bundle or more briefly as a component link. An LSP may be placed on a single component or may be spread out over multiple components. When traffic is spread out over multiple components, control plane signaling and management protocols report that the "all ones" component is used, indicated by a binary component number containing all ones (a near impossibly large component number).

Within any of these multipath techniques, the traffic across a multipath need not be evenly distributed. For example, an Ethernet Link Aggregation Group (LAG) may have some members (component links) of one capacity (10 Gb/s for example) and some members of another capacity (40 Gb/s or 100 Gb/s for example). In the case of link bundling, the component links may be other MPLS LSP, whose capacity is expressed as a real number in bytes per second.

A method and apparatus which simultaneously meets the following two requirements would be beneficial to the information network, in particular to large information networks.

1. The method and apparatus should be capable of transporting packets conforming to requirements to avoid packet reordering among traffic aggregates contained within larger traffic aggregates, specifically but not limited to MPLS-TP traffic aggregates within larger MPLS traffic aggregates.

2. The method and apparatus should be able to take advantage of multipath techniques.

It is to such a method and apparatus that the inventive concept disclosed herein is directed.

BRIEF DESCRIPTION OF THE DRAWINGS

As discussed above, the present disclosure describes methods and apparatus for transporting packets through a network which makes use of multipath techniques while retaining the order of the packets for traffic aggregates contained within larger traffic aggregates.

Like reference numerals in the figures represent and refer to the same element or function. Implementations of the disclosure may be better understood when consideration is given to the following detailed description thereof. Such description makes reference to the annexed pictorial illustrations, schematics, graphs, drawings, and appendices. In the drawings:

FIG. 7 illustrates exemplary MPLS label stack entries followed by an IPv4 header.

FIG. 8 illustrates exemplary MPLS label stack entries of which a label stack entry is supporting an Ethernet PW payload without a pseudowire (PW) code word (CW).

FIG. 9 illustrates exemplary MPLS label stack entries of which a label stack entry is supporting an Ethernet PW payload with a PW CW prior to the Ethernet PW payload.

DETAILED DESCRIPTION

Definitions

Figure 1:
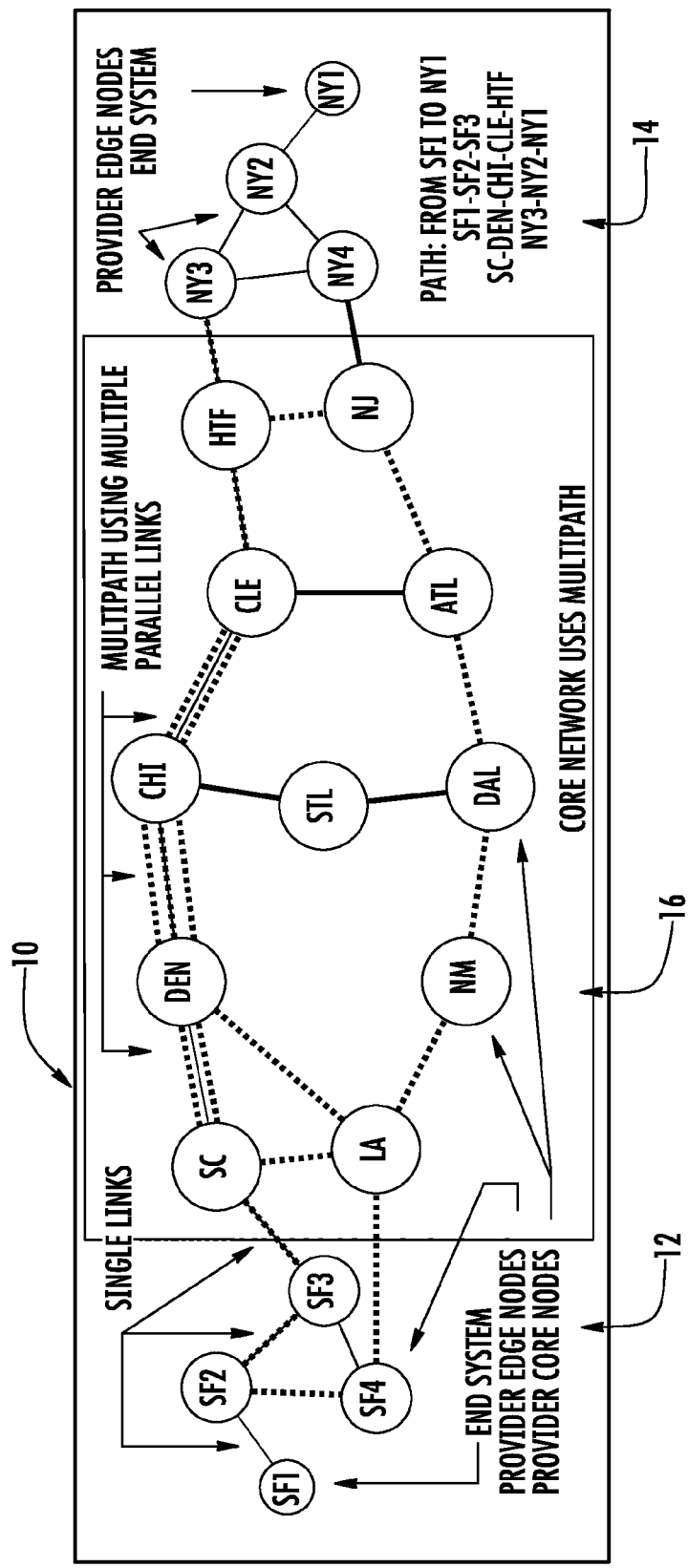
FIG. 1 is a diagram of an exemplary telecommunication network.

If used throughout the description and the drawings, the following short terms have the following meanings unless otherwise stated:

IEEE is an abbreviation for the Institute of Electrical and Electronic Engineers.

IETF is an abbreviation for the Internet Engineering Task Force.

RFC is an abbreviation for Request For Comment. IETF maintains a numbered series of documents known as the Request For Comment (RFC) series. Documents within the RFC series are assigned one of the following RFC classifications: historic, informational, experimental, best current practices, and standards track.

A packet switched network delineates packets and makes use of information contained in the packets, usually in packet headers, to determine where to forward each packet.

A circuit switched network requires that a connection or circuit be set up before any communication can begin and once set up a connection acts as an electrical circuit would, providing a fixed amount of capacity.

Network capacity can be measured in bits per second. Common units are kilobits per second, abbreviated Kb/s (thousand bits per second), megabits per second, abbreviated Mb/s (million bits per second), gigabits per second, abbreviated Gb/s (billion bits per second), and terabits per second, abbreviated Tb/s (trillion bits per second). If the "b" is capitalized in the abbreviation the "B" stands for bytes where a byte is eight bits.

A connection oriented network is a network which makes use of connection state to forward traffic. Circuit switched networks are connection oriented. Connection oriented networks also include packet switched networks which make use of connection state within a network to forward traffic, but generally allow a variable amount of capacity to be carried by a connection.

A connectionless network is a type of packet switched network which does not rely on connection state within the network to forward traffic. For example, an Internet Protocol network is a connectionless network.

Signal modulation is the method of transmitting electrical signals or optical signals such that bit levels can be determined by a receiver. A very simple modulation is a voltage differential on two wires. The amplitude, frequency, or phase of a carrier wave in an electrical signal may be modulated to indicate bit levels or patterns. The amplitude or phase of light may be modulated to indicate bit levels or patterns. Signal modulation occurs at among the lowest network layers, the physical layer. Where light of different frequency or polarization are multiplexed or switched optically there may be a lower layer that the signal modulation.

A networking protocol is an agreement among parties regarding the interpretation of bit patterns. Data plane protocols, control plane protocols, and management plane protocols serve different purposes within a network.

A data plane protocol makes use of information in packet headers to direct packets toward their destination and to guide other aspects of packet treatment within a network. Packet headers are followed by a packet payload which is uninterpreted data to be delivered to a destination.

Control plane protocols are used by the network elements to coordinate the forwarding of data plane protocols such that packets reach their intended destination. Once enabled on a set of network elements, control protocols exchange information directly among network elements with no further outside intervention. Control plane protocols may or may not use the same data plane that is exchanging information.

Management plane protocols are used by management systems to control or monitor network elements. Management systems may have some level of automation but also provide direct interface to human operators or indirect interfaces through database systems holding information about the network. Information in management system databases is generally at a higher level and often commercial in nature, such as customer information, customer attachment points, and services provided to customers. Management plane protocols may or may not use the same data plane that they are managing.

A routing protocol is a type of control plane protocol which carries information about the reachable destinations and/or network topology. This information may be used directly to create forwarding entries for connectionless data plane protocols or may be used as input to guide the behavior of signaling protocols in connection oriented data plane protocols.

A signaling protocol is a type of control plane protocol used to set up, maintain, and delete connections in connection oriented protocols.

Routing information is the information stored as a result of routing protocol exchange. Routing information often includes a representation of the network topology relevant to the particular routing protocol.

Packet encapsulation refers to the arrangement of bits dictated by a specific protocol. Protocols which define a packet header and packet payload further define the meaning of a set of bits or sets of bytes within the packet header, each set of bits or bytes known as a field in the packet header.

A packet payload is uninterpreted data that is carried within a packet. The payload of one encapsulation may be a complete packet of another type of encapsulation.

A packet header is part of a packet encapsulation which precedes the packet payload. The packet header may include information used to determine the type of packet payload being carried.

A node in a network is said to "forward a packet" when it receives a packet on an interfaces, determines where to send the packet, and transmits the packet. Except in unusual circumstances a packet is transmitted to a different interface than the one on which it was received. In some protocols, packet headers may be modified when forwarding a packet. A node is said to be "forwarding traffic" when it is receiving many packets on one or more interfaces and is forwarding some or all of those packets.

Forwarding state is the set of information stored in packet forwarding hardware such as non-transitive memory or other digital circuit which enables forwarding packets in the data plane based on information in the packet headers.

An outer encapsulation may be added to the packet creating additional network layers of encapsulation. Protocols may also define information following the packet payload, most commonly a single field known as a frame check sequence or cyclic redundancy check (which can be considered to be a specific type of frame check sequence).

An inner encapsulation exists where the packet payload of the outer encapsulation is not end system payload, but rather had already been encapsulated previously.

A network layer refers to either a physical layer or an encapsulation layer or a control plane layer or a management plane layer. For example, from the standpoint of control and management MPLS may be a single layer but from the standpoint of the data plane each MPLS label stack entry can represent a network layer.

A physical layer is one which directly modulates signals across a transmission media, such as electrical wires or optical fibers, or further multiplexes already modulated signals.

A network link layer is an encapsulation layer immediately above the physical layer which provides the lowest layer identification of packet boundaries.

A lower network layer or "inner encapsulation" is an encapsulation layer that is closer to the physical layer or physical layers with respect to some other encapsulation layer. Due to conflict with the MPLS notion of top of stack and bottom of stack, where "up" has the reverse sense, the term inner encapsulation is less ambiguous when referring to data plane encapsulations.

An upper network layer is a further encapsulation layer away from the physical layer or layers relative to some other encapsulation layer or layers. Due to conflict with the MPLS notion of top of stack and bottom of stack, where "up" has the reverse sense, the term outer encapsulation is less ambiguous when referring to data plane encapsulations.

A network topology is the physical or logical arrangement of active network elements and interconnections between network elements. A physical topology is the arrangement of physical network equipment and transmission media. A logical topology is the arrangement of active network elements and interconnections applicable to a specific protocol or set of protocols. A network topology is represented schematically with the type of diagrams used in the mathematics field of graph theory and similar terminology is used.

A node in a network or network topology refers to an active network element in a network topology. This use of the term "node" matches the use of the same term in graph theory.

A link in a network or network topology refers to an interconnection between nodes. The use of the term "link" in networking differs from graph theory terminology, where the term "edge" is used.

An end system is a node whose sole purpose in the network is to make use of the exchange of information provided by the network and not to provide services for other nodes in the network.

An edge node primarily serves to attach end systems to the network. The portion of the network topology that serves this purpose is collectively called the edge network or network edge.

An aggregation node is considered part of the network edge and serves mostly to aggregate edge traffic within a region prior to delivery to the network core.

A core node primarily serves to forward traffic between otherwise disjoint parts of the network edge. The portion of the network topology that serves this purpose is collectively called the core network.

Ethernet refers to a set of standards defined by the IEEE. The Ethernet standards are contained within IEEE 802.1 and IEEE 802.3 standard series.

IEEE 802 refers to a family of IEEE standards dealing with local area networks and metropolitan area networks.

IEEE 802.11s a working group of the IEEE 802 project of the IEEE Standards Association. The primary focus of IEEE 802.11s the IEEE 802 architecture and bridging.

IEEE 802.3 is a working group and a collection of IEEE standards produced by the working group defining the physical layer and data link layer's media access control (MAC) of wired Ethernet.

IP is an abbreviation of Internet Protocol which is a protocol defined by IETF and used for communicating data across a packet-switched internetwork. The Internet Protocol Suite includes IP and others protocols, also commonly referred to as TCP/IP due to the widespread use of Transmission Control Protocol (TCP) with IP.

IPv4 is an abbreviation of Internet Protocol Version 4.
IPv6 is an abbreviation of Internet Protocol Version 6.

CIDR is an abbreviation of Classless Interdomain Routing. CIDR is described in RFC 1466, RFC 1467, RFC 1481, RFC 1518, RFC 1519, RFC 4632 and other IETF RFC Series documents.

Packet traffic or simply "traffic" refers to data in the form of packets that are transmitted through the network.

A microflow is defined by the IETF as a single instance of an application-to-application flow of packets which is identified by source address, source port, destination address, destination port and protocol id. This definition is found in RFC 2475.

Conversation is defined by the IEEE with a similar meaning given to the term microflow as defined in IETF. The IEEE defined a conversation to be a single instance of an application-to-application flow of packets but left it up to the implementation to determine how to identify such a flow.

A traffic aggregate is a flow of traffic containing one or more microflows or smaller traffic aggregates. A traffic aggregate will generally contain very many microflows or smaller traffic aggregates. In many cases, today's networks carry millions of microflows within a single traffic aggregate.

A traffic flow may be either a microflow or a traffic aggregate.

End system traffic is traffic originated by an end system or terminated at an end system.

End system payload is the payload of the innermost packet encapsulation, which is the original encapsulation sent by an end system prior to adding any further layers of outer encapsulation.

Packet reordering refers to transmitting a set of packets in a different order than the order in which the packets were received. Packet reordering within a microflow is highly undesirable. Reasons are documented in RFC 2991.

An ordered aggregate is a traffic aggregate which should be forwarded with little or no packet reordering if possible. IETF defines ordered aggregate in RFC 3260 using terminology in RFC 2475, however that definition would require defining "behavior aggregate", "ordering constraint", "Per Hop Behavior (PHB)", and "PHB Scheduling Class (PSC)", which are all terms that are not otherwise needed in this context.

A multipath is a set of independent component links or component lower layer paths where traffic flows can be distributed over a set of components and where packet ordering can only be maintained for any traffic flows where all packets are sent on the same component.

A lower layer path is functionally equivalent or near equivalent to the functionality of a link at a higher layer, but where data plane service is delivered transparently over a lower layer and may traverse multiple nodes at the lower layer.

Inverse multiplexing is a technique where traffic can be distributed over a set of links and for which packet ordering can be maintained across the entire set of links.

A composite link may be either a multipath or a set of inverse multiplexed links.

A multipath component is one of the links or lower layer paths that make up a multipath.

A component link is generally accepted as a synonym for multipath component. MPLS Link Bundling uses the term component link regardless as to whether the component is a link or lower layer path.

A multipath technique is the protocol means by which a multipath is identified and managed. Examples are IP ECMP, Ethernet Link Aggregation, and MPLS Link Bundling.

Multipath traffic distribution is the distribution of traffic flows across the component links of a multipath.

A hash algorithm is a mathematical function which takes as input a value from a large number space which is sparsely populated and produces a much smaller set of bits than needed to represent an input value. The goal of a hash function is to spread the set of input values as evenly as possible over the output number space.

A hash operation is a transformation performed according to a hash algorithm.

IP Source and Destination Hash refers to the use of a hash of IP source address and IP destination addresses. The protocol number and UDP or TCP port numbers may also be used, but are generally not used in core networks.

ECMP is an abbreviation of Equal Cost Multi-Path. ECMP is a multipath technique where routing information indicates that a set of paths through the network have equal cost, where cost is simply a name given to a metric used in the network protocol. ECMP will generally try to balance traffic evenly across all paths, or balance traffic proportionally to the capacity of the immediately adjacent links in each path.

Link Aggregation is a multipath technique specific to Ethernet. Link aggregation is defined by IEEE 802.1AX-2008.

LAG is an abbreviation of Link Aggregation Group. A LAG is one instance of the use of Ethernet Link Aggregation.

A LAG member is a component link in the LAG. The use of the term "member" is unique to Ethernet Link Aggregation but is otherwise synonymous with "component" in more general discussion of multipath.

MPLS is an abbreviation of Multi-Protocol Label Switching. MPLS is defined by many documents in the IETF RFC series, including but not limited to RFC 3032 and RFC 3209.

LSP is an abbreviation of Label Switched Path. An LSP is a path through a network using Multi-Protocol Label Switching. An LSP is a form of network connection. Note that Label Switched Paths can be bidirectional or unidirectional. Please refer to RFC series IETF documents for further details.

LSR is an abbreviation of Label Switching Router. An LSR is a node capable of handling MPLS data plane traffic and/or MPLS control plane information.

An MPLS Label currently refers to the first 20 bits of a 32 bit Label Stack Entry (LSE) that is used to direct forwarding of MPLS traffic, although the details of the MPLS Label may change in future variations of the MPLS protocol.

LSE is an abbreviation of Label Stack Entry. A label stack entry is currently a 32 bit entry in the MPLS encapsulation added to the packet header, known as the label stack. A label stack entry currently includes a 20 bit label field, a 3 bit traffic class (TC) field (formerly EXP), a one bit bottom of stack (S) field, and an 8 bit time-to-live (TTL) field although this may change in future variations. The current format is defined in RFC 3032.

A Label Stack is the packet header for the MPLS protocol. A label stack consists of one or more Label Stack Entries (LSE). A first LSE is referred to as the top of the label stack. All LSE in the label stack currently have the S bit (bottom of stack) set to zero, except a last LSE which has the S bit set to one, although this could change in future variations.

ILM is an abbreviation of Ingress Label Map. The ILM is a standard data structure used in the data plane for the MPLS protocol. The ILM is stored on a non-transitive memory or other non-transitive data structure holding a subset of the MPLS forwarding state. The ILM is described in RFC 3031.

MPLS-TP is an abbreviation of Multiprotocol Label Switching-Transport Profile. MPLS-TP is a subset of MPLS intended to provide capabilities and management that is more similar to transport network operators than MPLS. Extensions of MPLS have been defined specifically for MPLS-TP, mostly in the area of operations and management; however MPLS-TP remains a subset or restricted usage of MPLS.

OAM is an abbreviation of Operations and Management. OAM in MPLS and/or MPLS-TP refers to protocols which support measurement of performance, verification of connectivity, diagnostics, and data plane switching to protection capacity when indicated by working path connectivity checks.

LM is an abbreviation of Loss Measurement. LM is a function of OAM.

MPLS Link Bundling refers to a MPLS routing, control plane, and data plane technique which allows multiple links or paths between a pair of MPLS LSRs to be represented in a routing protocol as a single LSR adjacency. Any one link or path in the link bundle is referred to as a component of the link bundle. An LSP may be placed on a single component or may be spread out over multiple components. When traffic is spread out over multiple components, signaling reports that the "all ones" component is used, indicated by a binary component number containing all ones (a near impossibly large component number).

MPLS Label Stack refers to a Label Stack configured in accordance with the MPLS protocol.

PW is an abbreviation of Pseudowire. PW makes use of a label stack entry (LSE) in the packet that is used in providing an edge-to-edge emulated layer-2 service. One such encapsulation is Ethernet, in which case the PW provides an emulated Ethernet service. PW is defined by the IETF Pseudowire Edge-to-Edge Emulation (PWE3) working group (WG).

SS-PW is an abbreviation of single-segment pseudowire. A single segment pseudowire consists of two end nodes (known as endpoints, and/or provider edges) and a single interconnection provided by a lower layer. Typically the lower layer supporting a PW is MPLS.

MS-PW is an abbreviation of multi-segment pseudowire. A multi-segment pseudowire may have one or more intermediate nodes in addition to having two end nodes (known as endpoints and/or provider edges). The interconnection between the end nodes is provided by a lower layer, typically MPLS.

T-PE is an abbreviation of terminating provider edge. A T-PE is an endpoint in either a SS-PW or a MS-PW.

S-PE is an abbreviation of switching provider edge. A S-PE is an intermediate node in a MS-PW.

PW CW or CW is an abbreviation of Pseudowire Control Word. A CW is currently a 32 bit encapsulation that immediately follows the label stack in a PW data plane encoding although the details of the CW may change in future variations. The CW indicates whether the packet payload using the MPLS protocol is a PW payload or PW OAM and also serves to insure that the PW payload is not mistaken for an IP payload if a multipath technique is configured to look for a potential IP payload after the MPLS label stack.

Ethernet Pseudowire is a PW which carries an Ethernet payload. Ethernet PW is by far the most common type of PW. Ethernet PW is defined by RFC 4448.

Network scalability refers to the ability of the network to scale, meaning to grow to a very large size. Some types of network protocols are unable to scale to a very large size and in particular to grow to a support a global network. Many network protocols which are capable of scaling well require that traffic be aggregated to reach their scaling potential.

A telecommunications service provider ("provider") is a business which operates the network for profit which may deliver services including telephony, circuit based services, virtual private networks, and computer networking services such as Internet service. Some terminology specific to telecommunications service providers has historical origins, accounting for the terminology differing from networking in general.

A provider network is a network that is owned and/or operated by a telecommunications service provider.

A customer site represents the point at which a customer of a telecommunications service provider attaches to the provider network.

A metro node is a historical term used by telecommunications service providers in describing one or more nodes of the provider adjacent to customer sites or providing aggregation near customer sites. The term "metro node" is related to the term metropolitan area network which dates back to when a fiber optical ring around a metropolitan area was considered a network in of itself.

COE is an abbreviation of Connection Oriented Ethernet. Ethernet Provider Bridging and Provider Backbone Bridging are forms of COE, both of which define a data plane but do not define a control plane. COE is commonly used by telecommunications service providers in newer metropolitan area portions of provider networks.

RAM is an abbreviation of random access memory. RAM takes an address as input and returns the content of memory at that address. Currently, there are two general forms of RAM. SRAM (static RAM) is appropriate for small to medium memories on integrated circuits, including those containing custom or semi-custom digital circuits. DRAM (dynamic RAM) is generally used for large external memories.

CAM is an abbreviation of content addressable memory. CAM, unless otherwise specified is assumed to be binary CAM. A CAM matches input against the contents of each entry in parallel and returns either an index or contents associated with the first entry matched. CAM is a common functional module in integrated circuits.

TCAM is an abbreviation of ternary content addressable memory. Unlike binary CAM, TCAM matches against contents after applying a set of mask bits associated with each entry. Like CAM, TCAM returns either an index or contents associated with the first entry matched. TCAM is a common functional module in integrated circuits.

A logic circuit, as used herein, may be any circuit that is sufficiently limited so as to not operate on a set of instructions. Exemplary logic circuits includes combinatorial logic and sequential logic. Combinatorial logic may make use of simple logical "and", "or", and "not" operations and may not be clocked. Sequential logic may be clocked and may implement a simple state machine. Further, sequential logic may make use of combinatorial logic. A CAM, TCAM, or memory are also examples of logic circuits.

A processing device or processor may be, for example, as any circuit which operates on a set of instructions to implement an algorithm. A processing device or processor can be composed of digital circuits and may include an instruction pointer and one or more data pointers. The instruction set of a processor resides in non-transitory memory. In one example, the processing device or processor includes a circuit which qualifies as a Turing machine as defined by Alan Turing.

Please refer to RFC series IETF documents for further details regarding IP, MPLS, LSP, LSR, MPLS labels, MPLS label stack entries, MPLS label stack, MPLS-TP, MPLS Link Bundling, MPLS-TP OAM, and PW.

Discussion

One embodiment of the inventive concept disclosed is discussed herein in detail. The inventive concept is not limited in its application to the details of construction and the arrangement of the components or steps or methodologies set forth in the following description or illustrated in the drawings. The inventive concept disclosed herein is capable of other embodiments or of being practiced or carried out in various ways. Also, it is to be understood that the phraseology and terminology employed herein is for the purpose of description and should not be regarded as limiting in any way.

FIG. 1 illustrates an exemplary embodiment of a network 10 constructed in accordance with the present disclosure. The network 10 is an example of a telecommunications network with a specific topology and hierarchical design. The network 10 has a first edge network 12, a second edge network 14 and a core network 16, however it should be understood that the network 10 may be other types and have other network topologies. For example, the network 10 can be maintained within one or more data centers, and generally can be any type of network for which multipath is useful.

FIG. 1 illustrates a logical topology of the network 10. It should be understood that the network 10 is not limited to any particular topology. For the purpose of illustrating a usage of the inventive concept the network 10, the core network 16 will be described as using the MPLS protocols within the core network 16, using multipath within the core network 16, using MPLS-TP within the first and second edge networks 12 and 14, and not using multipath within the first and second edge networks 12 and 14. The example examined in detail here is one where the core network 16 of the network 10 carries larger traffic aggregates within MPLS LSP which contain smaller MPLS-TP traffic aggregates, which in turn may contain still smaller traffic aggregates and/or may directly contain end system traffic.

For purposes of example, the first edge network 12 includes nodes SF1, SF2, SF3, and SF4. The core network 16 includes nodes SC, DEN, CHI, CLE, HTF, LA, NM, STL, DAL, ATL and NJ. The second edge network 14 includes nodes NY1, NY2, NY3 and NY4. The nodes SF1 and NY1 are end systems; the nodes SF2, SF3, SF4, NY2, NY3, and NY4 are edge nodes; and the nodes SC, DEN, CHI, CLE, HTF, LA, NM, STL, DAL, ATL and NJ are core nodes. For purposes of this example, the nodes SF3, SF4, NY3 and NY4 may also be considered aggregation nodes which aggregate edge traffic prior to delivery to the core nodes of the core network 16.

Figures 2, 3:
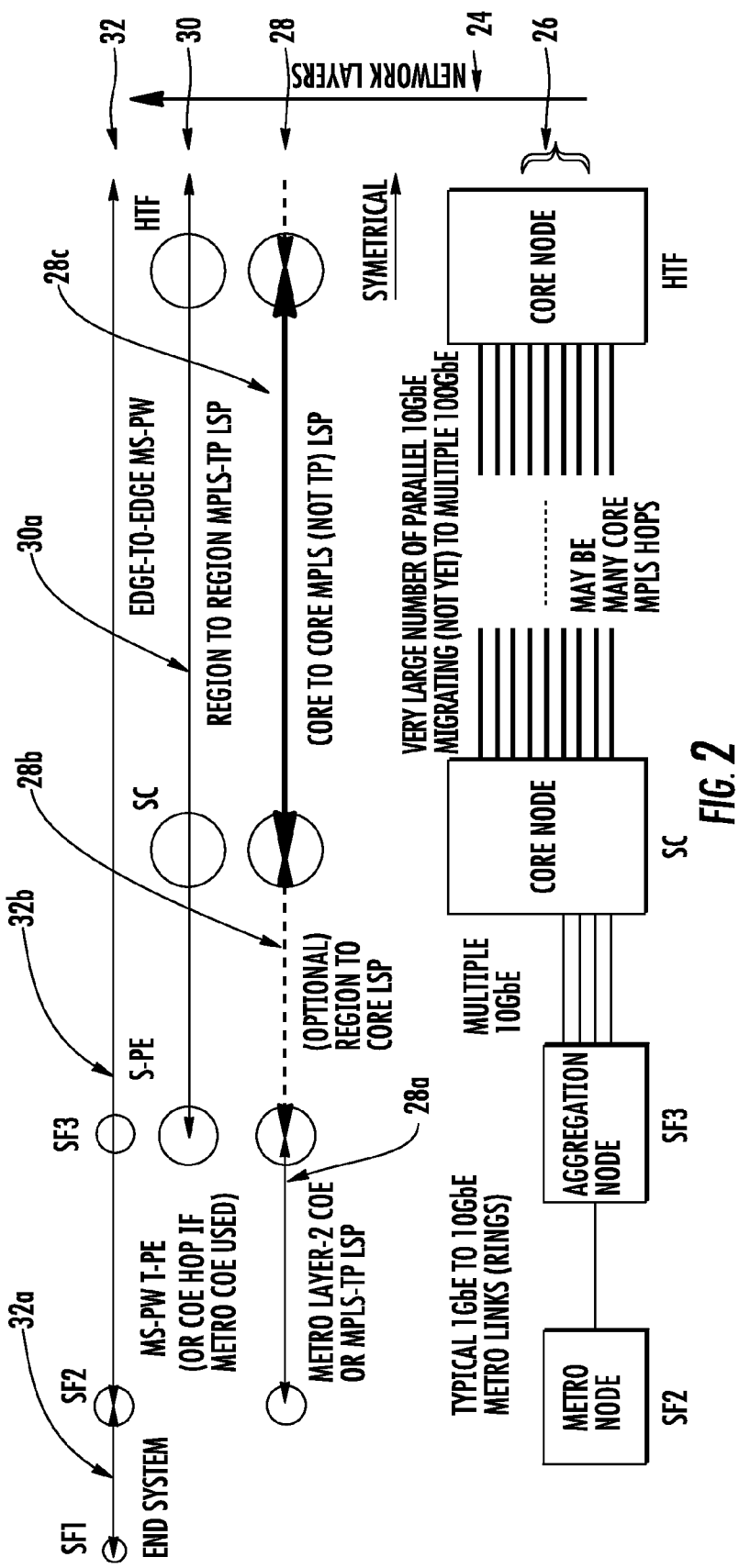
FIG. 2 is a schematic diagram illustrating an exemplary protocol layering supporting traffic aggregates contained within larger traffic aggregates.
FIG. 3 through FIG. 6 illustrate exemplary header encapsulations used by MPLS, IPv4, PW CW, and Ethernet respectively.
Figure 4:
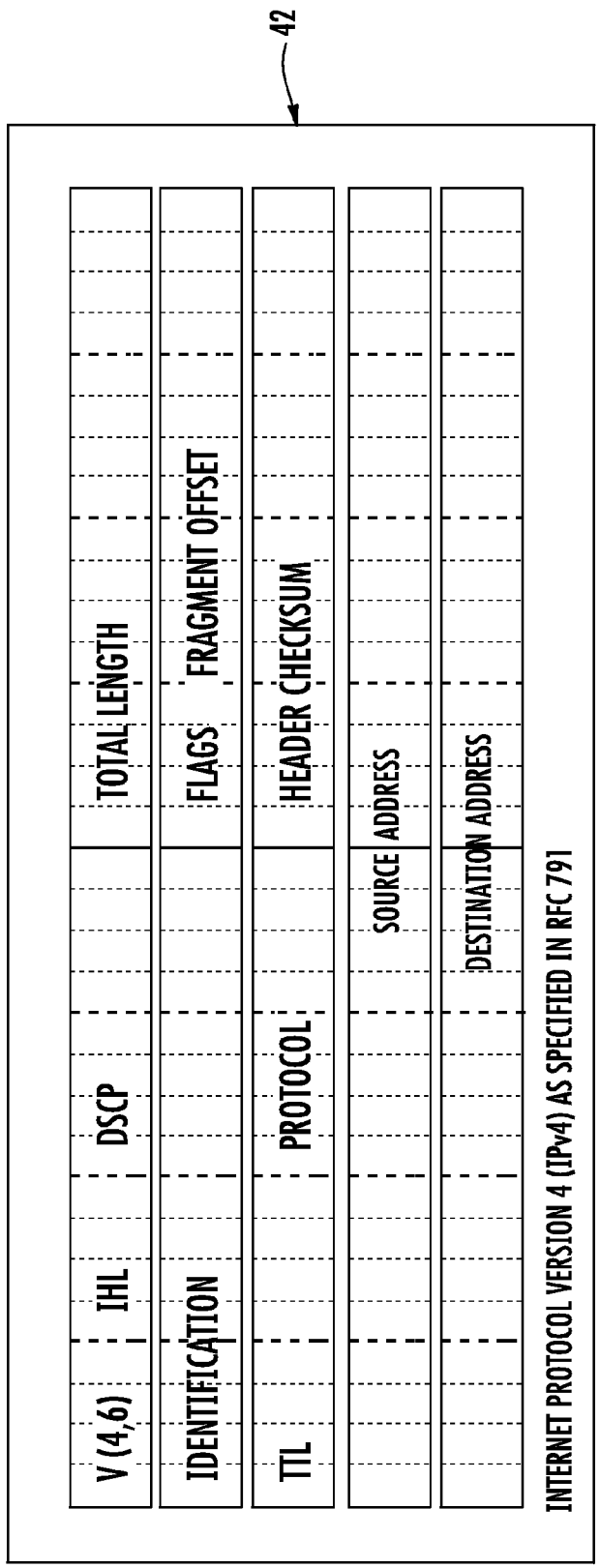
Figure 5:
Figure 6:
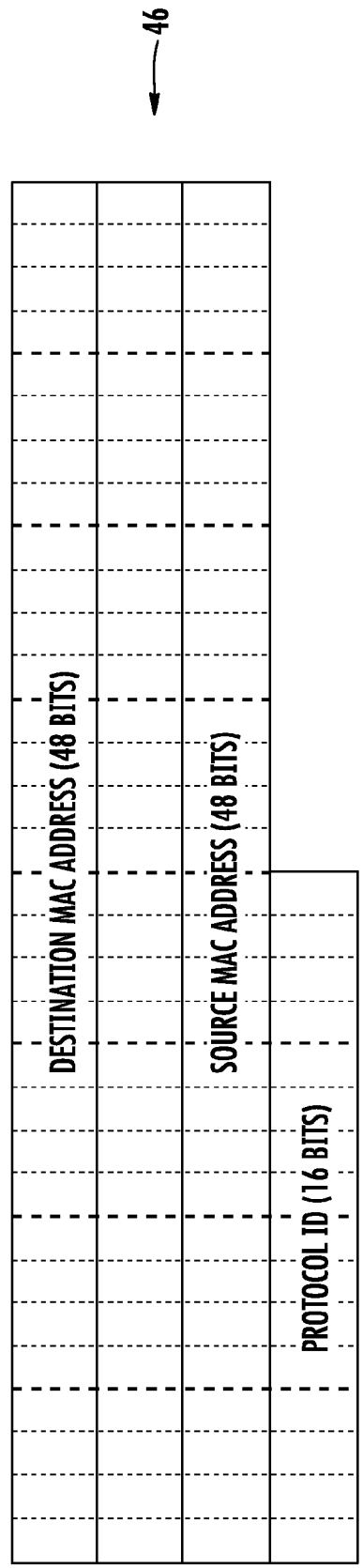

FIG. 2 is a schematic illustration of traffic aggregates contained within larger traffic aggregates. In particular, FIG. 2 illustrates a single exemplary PW carried within an MPLS-TP traffic aggregate carried within a larger MPLS traffic aggregate. A very large number of PW may be carried within the network 10.

The purpose of FIG. 2 is to illustrate a set of protocols which may be used to deliver a traffic flow. In FIG. 2, a vertical axis 24 represents relative layering. Not all layers are shown in FIG. 2, only layers relevant to this discussion. For example, MPLS cannot be used as a link layer and therefore requires a link layer between MPLS and the physical layer. Ethernet in contrast can be used as a link layer or carried within another protocol, such as in an Ethernet PW. Shown in FIG. 2 is a physical layer 26, a first encapsulation layer 28, a second encapsulation layer 30, and a third encapsulation layer 32. In FIG. 2, a line with a line beneath it indicates a layer contained within another layer.

Layering may differ in the core network 16 and in each edge network 12 and 14. For example, the third encapsulation layer 32 includes a PW layer 32b at the top from node SF2 to HTF and beyond. The second encapsulation layer 30 includes a region to region MPLS-TP LSP encapsulation layer 30a from node SF3 to node HTF and beyond. The first encapsulation layer 28 includes a core MPLS LSP 28c, which is shown by the wide arrow from SC to HTF. The MPLS-TP LSP 30*a* of the second encapsulation layer 30 is carried over this core MPLS LSP 28*c* of the first encapsulation layer 28. The third encapsulation layer 32 is carried within the second encapsulation layer 30. Ultimately all of these encapsulation layers, i.e., the second and third encapsulation layers 28, 30 and 32 are carried within the first encapsulation layer 28 and the physical layer 26, which is drawn schematically along the bottom of FIG. 2.

It should be noted that the network 10 also includes a link layer which is not shown. In the example shown in FIG. 2, the number of layers 28, 30 and 32 can vary and change depending on the location within the network 10. For example, the customer attachment 32*a* may have only an Ethernet which could be drawn above the PW 32*b* of the third encapsulation layer 32. In the edge network 12, the PW as drawn makes use of COE 28*a*. In practice carrying a PW using COE may require using a GRE tunnel over IP over COE or using L2TP over IP over COE. The customer attachment 32*a*, the COE in the edge network 28*a*, and the optional region to core LSP 28*b* are not relevant to the discussion except to provide a more complete example and to illustrate that network layering differs throughout the network 10. The PW 32*b*, inter-region MPLS-TP LSP 30*a*, and core MPLS LSP 28*c* are directly relevant to the discussion of an example usage of the claim.

For the purpose of example the network 10 in FIG. 1 is assumed to be a subset of a telecommunications service provider network with a customer site in San Francisco and a customer site in New York. One potential path for the PW in FIG. 2 is the path from the node labeled SF1 to the node labeled NY1 in FIG. 1, including nodes SF1 to SF2 to SF3 to SC to DEN to CHI to CLE to HTF to NY3 to NY2 to NY1. This path is assumed to be bidirectional.

FIG. 2 identifies one end system, i.e., the node SF1, and indicates that FIG. 2 is symmetric left to right, with the right side not completely drawn. The end system traffic is this case may be Ethernet. In FIG. 1 the end system traffic may be bidirectional Ethernet traffic from the node labeled SF1 to the node labeled NY1.

FIG. 2 indicates that a multi-segment PW (MS-PW) 32*b* is used. The metropolitan area nodes (abbreviated "metro node" in FIG. 2) serve as the end points of the PW, are also known as terminating provider edge nodes (T-PE), in the PW in FIG. 2. The PW terminating provider edge nodes (T-PE) in FIG. 1 would be SF2 and NY2 if the same set of protocols were used as are used in the PW 32*b* in FIG. 2.

The PW 32*b* in FIG. 2 intermediate nodes are known as signaling provider edge nodes (S-PE). In FIG. 2, the S-PE function is provided by aggregation nodes. In FIG. 1, the S-PE would likely be SF3 and NY3.

A lower layer is used to deliver PW traffic from a T-PE to an S-PE and from S-PE to S-PE. In FIG. 2 labeling near 28*a* it is pointed out that either Connection Oriented Ethernet (COE) such as Ethernet Provider Bridging (PB) or an MPLS-TP LSP could be used to provide the underlying layer for the T-PE to S-PE traffic flow. This is illustrative of the potential to mix layer types. The T-PE to S-PE traffic flows in FIG. 1 would be from node SF2 to node SF3 and node NY2 to node NY3.

A lower layer is used to deliver PW traffic from one S-PE to an adjacent S-PE. In FIG. 2, the MPLS-TP LSP 30*a*, is used from the aggregation node, such as SF3 in one region to an aggregation in another region (not shown in FIG. 2, NY3 in FIG. 1). In FIG. 1 this traffic flow from S-PE to S-PE would be carried within an MPLS-TP LSP from node SF3 to node NY3.

The traffic flow carried by MPLS-TP LSP 30*a* in FIG. 2 may aggregate many PW and may carry IP traffic directly. The MPLS-TP LSP 30*a* in FIG. 2 takes the same path as the S-PE to S-PE portion of the PW 32*b* in FIG. 2. For example, the service provider supporting the network 10 in FIG. 1 is very likely to have more than one customer with locations in San Francisco and New York. The MPLS-TP LSP (30*a* in FIG. 2) from node SF3 to node NY3 is an example of a first traffic aggregate within a second larger traffic aggregate (MPLS LSP 28*c* in FIG. 2) which requires that all traffic for the first traffic aggregate transmitted by one node remain in that same order when received by another node.

For scaling reasons, a provider may chose to further aggregate traffic from a region to an adjacent core node. In FIG. 1 this would be from node SF3 to node SC or from node NY3 to node HTF. For example, many aggregated MPLS-TP traffic flows from node SF3 may use the node labeled "SC" but terminate at many other nodes. In FIG. 2 this is labeled as an optional region to core LSP 28*b*. The region to core link may also use multipath, though in FIG. 1, this is not the case as illustrated for node SF3 to node SC or node NY3 to node HTF.

In FIG. 2, traffic from one core node, across the core network 16, to a distant core node is aggregated using the first encapsulation layer 28, which in this example is an MPLS LSP 28*c*. In FIG. 1 this MPLS LSP would be from node SC to node HTF by way of the path using the node SC to node DEN to node CHI to node CLE to node HTF. In both FIG. 2 and FIG. 1, this core to core path makes use of multipath at every section of the path (at each hop). This core to core LSP 28*c* may carry a large number of MPLS-TP LSP and may also carry other traffic.

The traffic flow carried by MPLS-TP LSP 30*a* in FIG. 2 serves as an example of a traffic aggregate which requires that all packets within the traffic flow be forwarded in the order received whenever practical to do so.

The MPLS LSP 28*c* in FIG. 2 in addition to carrying the traffic flow carried by MPLS-TP LSP 30*a* in FIG. 2 may aggregate zero or more additional MPLS-TP traffic flows, zero or more MPLS traffic flows, zero or more PW carried directly, and may carry IP traffic. The MPLS traffic flow illustrated in FIG. 2 serves as an example of a traffic aggregate for which strict ordering is not required over the traffic aggregate and for which one or more traffic aggregates is contained within it which requires that traffic in that contained traffic aggregate be forwarded in the order received whenever practical to do so.

In FIGS. 3, 4, 5, and 6 no payload is shown; only the packet headers are shown. FIG. 3, FIG. 4, FIG. 5, and FIG. 6 illustrate the format of the encapsulation of an MPLS Label entry 40, an IP header 42 (e.g., Version 4), a PW Control Word (CW) 44, and an Ethernet header 46. These illustrations are included for clarity and are based on the IETF RFC series document which define these protocols, RFC 3032 (updated by RFC5462), RFC 791 (updated by RFC 1349), RFC 4385, and IEEE 802.3 as modified by RFC 4448 for use as an Ethernet PW payload (Ethernet preamble and start byte omitted).

Figure 7:
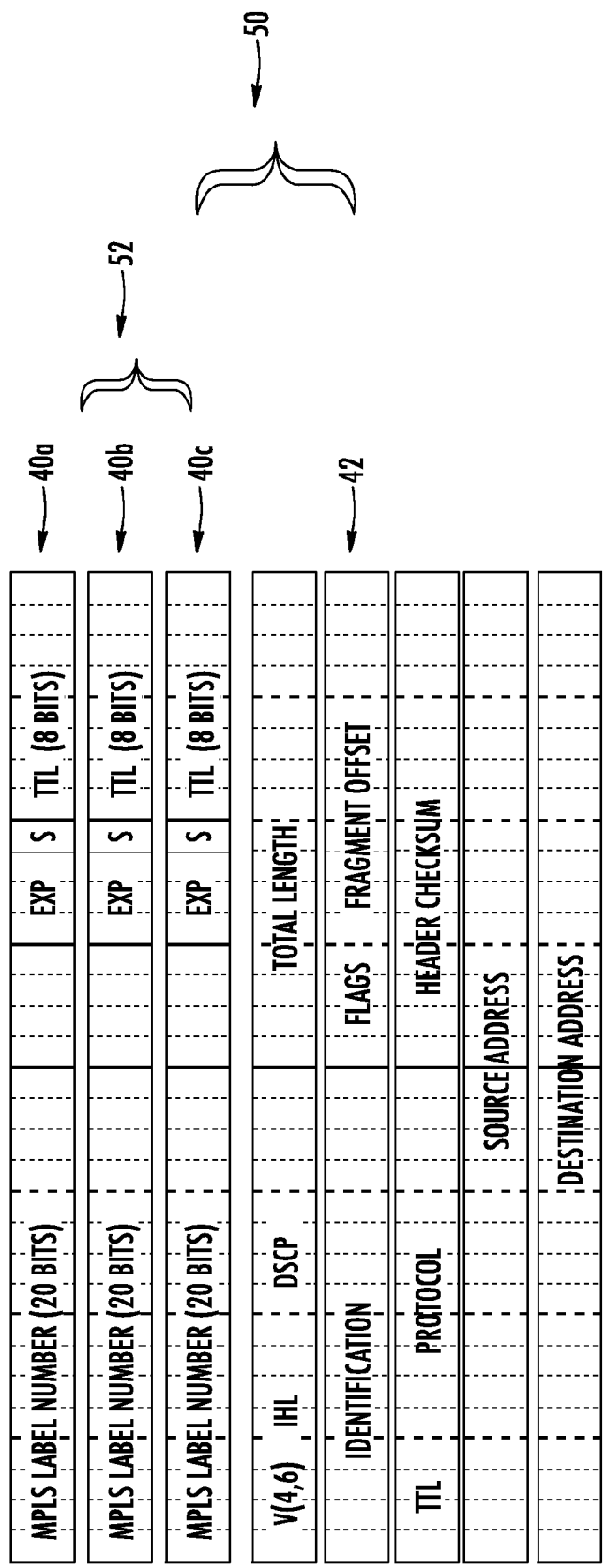
FIG. 7 through FIG. 9 illustrate compositions of protocol headers used in accordance with the present disclosure.
Figure 8:
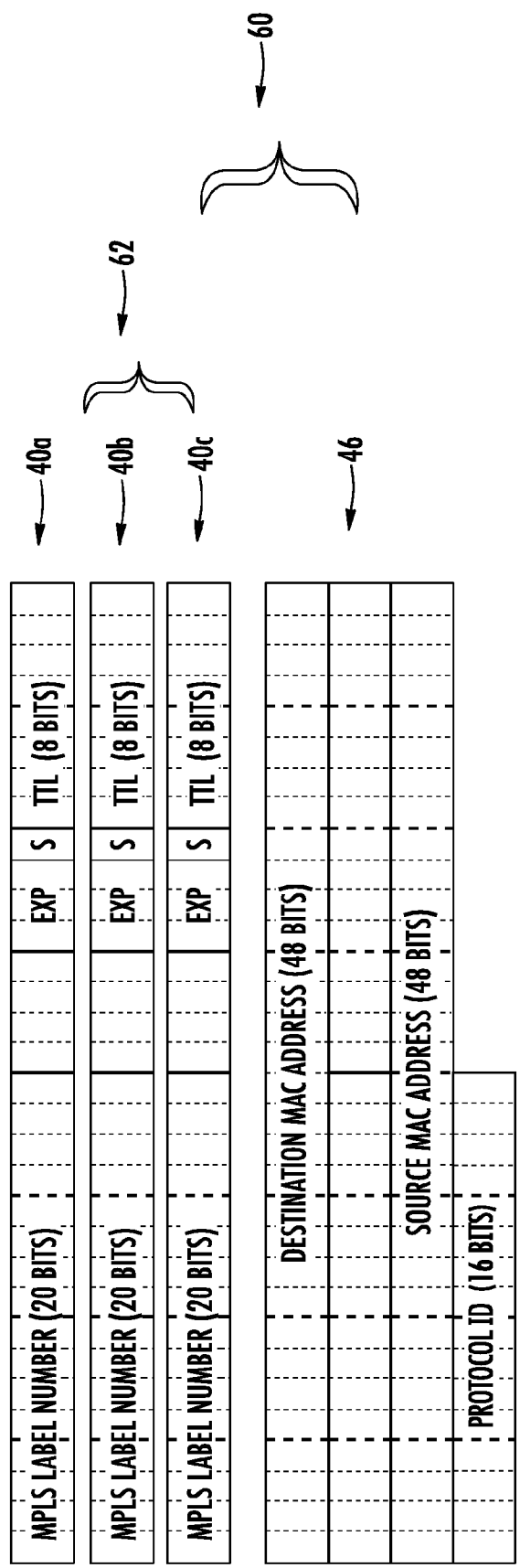
Figure 9:
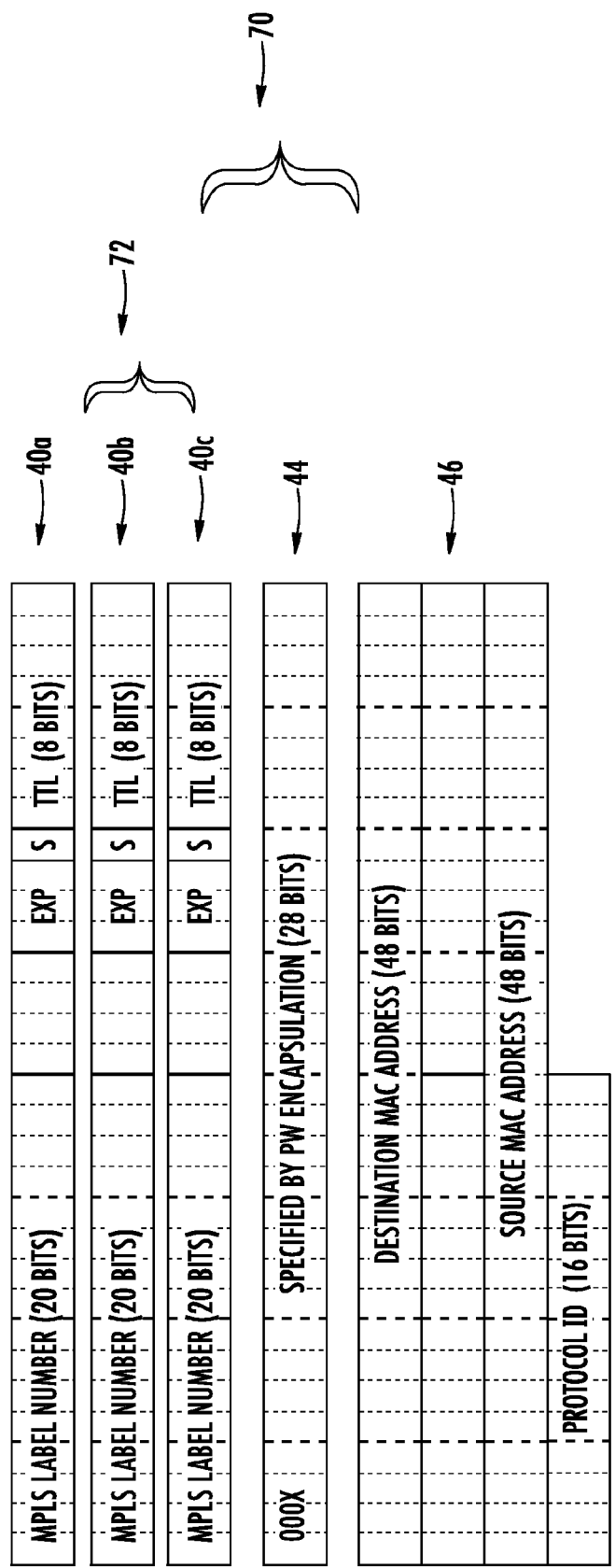

FIG. 7, FIG. 8, and FIG. 9 illustrate common encapsulations of traffic within MPLS networks. The encapsulations illustrated in FIG. 7, FIG. 8, and FIG. 9 are composed of combinations of the encapsulations illustrated in FIG. 3, FIG. 4, FIG. 5, and FIG. 6. These types of encapsulation serve as examples for the purpose of illustration of both existing multipath techniques and illustration of the inventive concept.

Shown in FIG. 7 is a set of packet headers 50 with a label stack 52 followed by the IP header 42. The label stack 52 has three MPLS label entries 40*a*, 40*b* and 40*c*

FIG. 8 shows a set of packet headers 60 with a label stack 62 followed by the Ethernet header 46. FIG. 9 shows a set of packet headers 70 with a label stack 72 followed by the PW Control Word (CW) 44 and the Ethernet header 46. PW encapsulation makes use of an MPLS label stack entry. One of the label entries 40a, 40b, or 40c in FIG. 8 and in FIG. 9 must carry a label number which has been configured for use as a PW or has been set up for use as a PW using a control plane protocol.

Common practice in MPLS networks making use of multipath is to make use of all label entries 40a, 40b, and 40c in the label stack 52, 62, 72 and make use of any potential IP header below the MPLS layer in the multipath load distribution. If packets are MPLS encapsulated, a bottom of the label stack 52, 62, 72 (which in this example is the label entry 40c) is located and the MPLS payload is assumed to be IPv4 if a 4 is found in the first four bits of the MPLS payload and the MPLS payload is assumed to be IPv6 if a 6 is found in the first four bits of the MPLS payload.

In practice, IP and pseudo-wires are the only MPLS payloads found in most (if not all) MPLS networks. A pseudowire code word may be included in the packet, and if used prevents a PW payload from being accidentally interpreted as an IP packet carried as MPLS payload. If a potential IP header is not found, common practice is to use the label stack (62 or 72 in FIG. 8 and FIG. 9) in the hash, or at least as many label entries 40 near the bottom of the label stack 62 or 72 as practical are used.

Note that in FIG. 8, a value of 4 or 6 in the first four bits of the Ethernet Destination MAC (media access control) Address would cause the PW payload 46 in FIG. 8 to be mistakenly interpreted as an IP packet by nodes along the LSP path. This risk is noted in RFC 4385 and is the sole topic of RFC 4928.

In the absence of the methods disclosed herein the use of multipath can and generally does degrade the full operations and management capabilities for the MPLS-TP traffic. The use of common multipath techniques can and often does spread aggregated traffic over links with slightly different effective delay, thereby causing potential reordering of traffic within those traffic aggregates. Traffic aggregates such as MPLS-TP require that reordering not occur if possible and this requirement is not met by common multipath techniques. Using the methods disclosed herein, multipath can be used and the reordering of traffic within traffic aggregates can be avoided.

The primary purpose of aggregating traffic is often to improve scalability. More specifically aggregating traffic reduces the amount of routing information, and the amount of forwarding state, for example in the core network 16 of the network 10. Since routing information changes, the nodes within the core network 16 need only focus on any large shifts in traffic flow made necessary by topology change in the core network 16, such as a network fault. The nodes in the core network 16 need not be concerned with the much large number of small changes in the way traffic which is carried in the core network 16 is routed closer to the edges of the network 10.

Providing information on smaller traffic aggregates would defeat the primary purpose of aggregating traffic. This includes providing detailed information on which smaller traffic aggregates have requirements to maintain packet ordering and which do not.

The claim covers a technique which is consistent with the scalability goals that are addressed by further aggregating traffic. Additional information, such as control plane information, can be provided only about the traffic aggregate, preferably with no additional information provided for each of the very large number of individual smaller traffic aggregates contained within the larger traffic aggregate. For example, the control plane information can be set up using RSVP-TE extensions. RSVP-TE is defined in RFC 3209 and in other documents in the RFC series.

The additional information carried within the control plane exchange setting up the larger traffic aggregate is whether the large traffic aggregate itself requires that traffic remain in the order it is received and if not, if any traffic aggregate is contained where the contained traffic aggregate requires that traffic remain in the order it is received, and if so the depth of encapsulation of the first layer at which a traffic aggregate exists which requires that traffic remain in the order it is received. This yields three cases.

If the larger traffic aggregate requires that traffic remain in the order it is received, then traffic can be handled in a conventional manner. Most multipath techniques, such as Ethernet Link Aggregation could not be used. MPLS Link bundling can be used, with the larger traffic aggregate placed on a single MPLS Link Bundle component link.

If the larger traffic aggregate does not require that traffic remain in the order it is received, and the larger traffic aggregate does not contain any traffic aggregates that require that traffic remain in the order it is received, then traffic for the larger traffic aggregate can be handled in a conventional manner utilizing any of a number of existing multipath techniques. In this case, it is desirable to maintain packet order for microflows or conversations (IETF and IEEE terminology respectively) but not for contained traffic aggregates.

The remaining case is where the larger traffic aggregate does not require that traffic remain in the order it is received, but the larger traffic aggregate contains one or more traffic aggregates that require that traffic remain in the order it is received. The information carried for the large traffic aggregate includes the smallest depth of encapsulation of any contained traffic flow or flows which require that traffic remain in the order it is received.

The additional information carried for the large traffic aggregate may also include other information that is useful in constraining the load balance for a specific type of encapsulation. For example, for MPLS, whether it is safe to look past the MPLS label stack for a potential IP header, can be included. It is safe to do so when it is safe for all of the contained traffic aggregates. For example, it is safe to do so if all MPLS-TP LSP are containing only PW payloads and all PW are using PW CW.

For this third case the inventive concept disclosed herein specifies a change to the way packets within the large traffic aggregate are forwarded. Information in the packet headers used as the basis for selecting a component link cannot be retrieved until after a forwarding lookup based on the larger traffic aggregate. A set of instructions is retrieved during the forwarding lookup. The set of instructions can be hash instructions 82 as set forth in FIG. 11. However, it should be understood that other types of instructions for load balancing, whether hash based or not, can be used.

These hash instructions 82 determine which packet header fields within the encapsulation may be used as a basis for selecting which component of the multipath on which to forward a specific packet.

For example, for MPLS using a hash based algorithm, the hash instructions 82 include a limit on the label stack depth over which the hash may operate, and indicates whether to consider a potential IP header after the label stack 52, 62, or 72, for example.

Returning to FIG. 1, traffic with the encapsulations illustrated in FIG. 7, FIG. 8, and FIG. 9 may be received at the node DEN from the node SC. A specific packet may be associated with the traffic carried within the MPLS LSP from SC to HTF. This is determined by looking at the label stack entry 40a, which is the top or outermost entry. In current versions of MPLS, the label stack entry 40a is the first 32 bits in the packet encapsulation transmitted from SC. The lookup based on the label stack entry 40a makes use of a table (or other data structure) known as the ingress label map (ILM) 80a in FIG. 10 or 80b in FIG. 11.

Conventionally, the ILM 80a would only indicate that the packet should be directed toward CHI and no constraints on the multipath load distribution method would be contained within the ILM 80a. Using the inventive concept disclosed herein, additional information 82 is held in the ILM 80b which guides the multipath load distribution.

Figure 10:
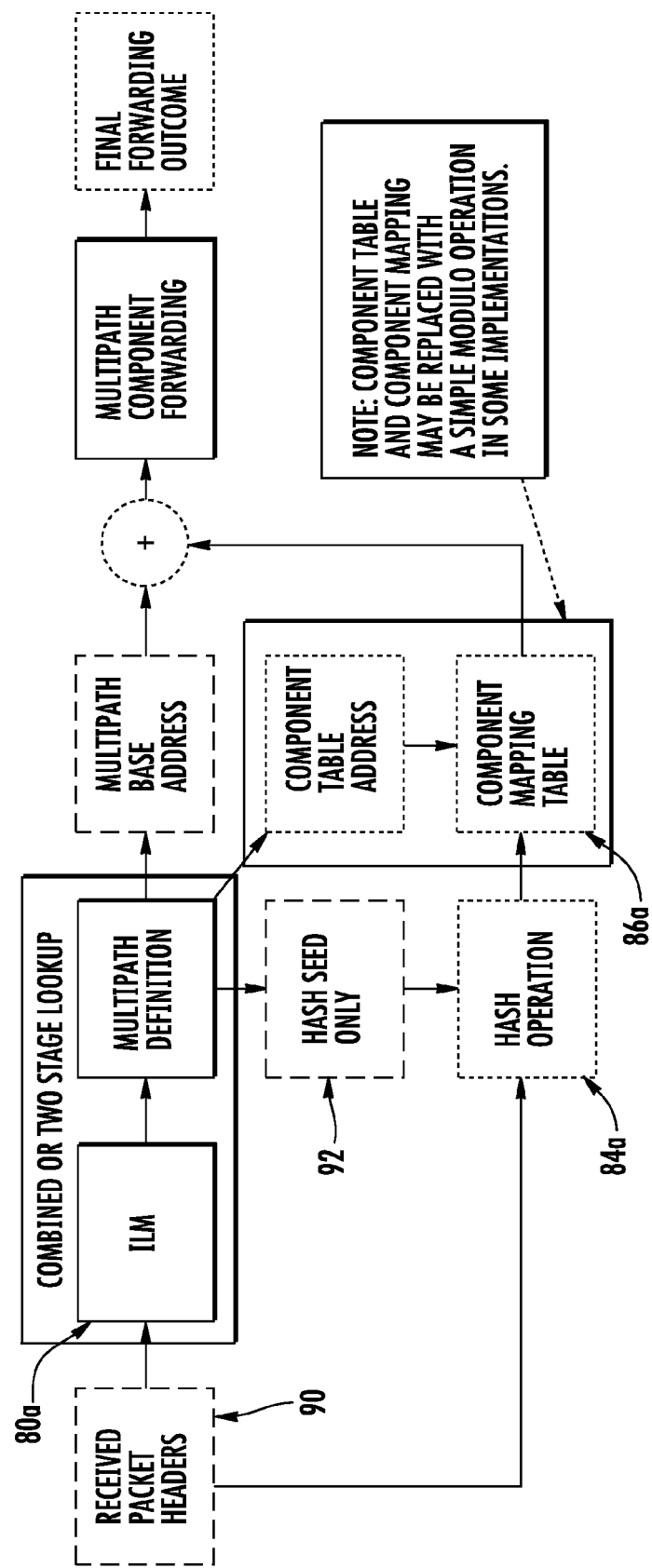
FIG. 10 illustrates a prior art logic flow within packet processing forwarding decision circuitry used in a network element in the absence of the inventive concept disclosed herein.

FIG. 10 provides a block diagram depicting an exemplary ILM 80a lookup and load distribution 84a and 86a that is typical in the absence of the inventive concept disclosed herein. The load distribution in FIG. 10 is based on a hash algorithm, a very common multipath load distribution technique.

It is desirable to implement many of the functional blocks illustrated in FIG. 10 in dedicated electronic circuitry for reasons of performance and efficiency. Typically this set of functional blocks is implemented as a portion of the functionality on a single integrated circuit, though some functions may be implemented in external circuitry. For example, the ILM may be implemented as an external memory or as an external specialized logic such as a binary content addressable memory (CAM) or ternary content addressable memory (TCAM) when the TCAM is used for other purposes. Processing functionality can be implemented using one or more processors, combinatorial logic, an Application Specific Integrated Circuit (ASIC) and combinations thereof.

Figure 11:
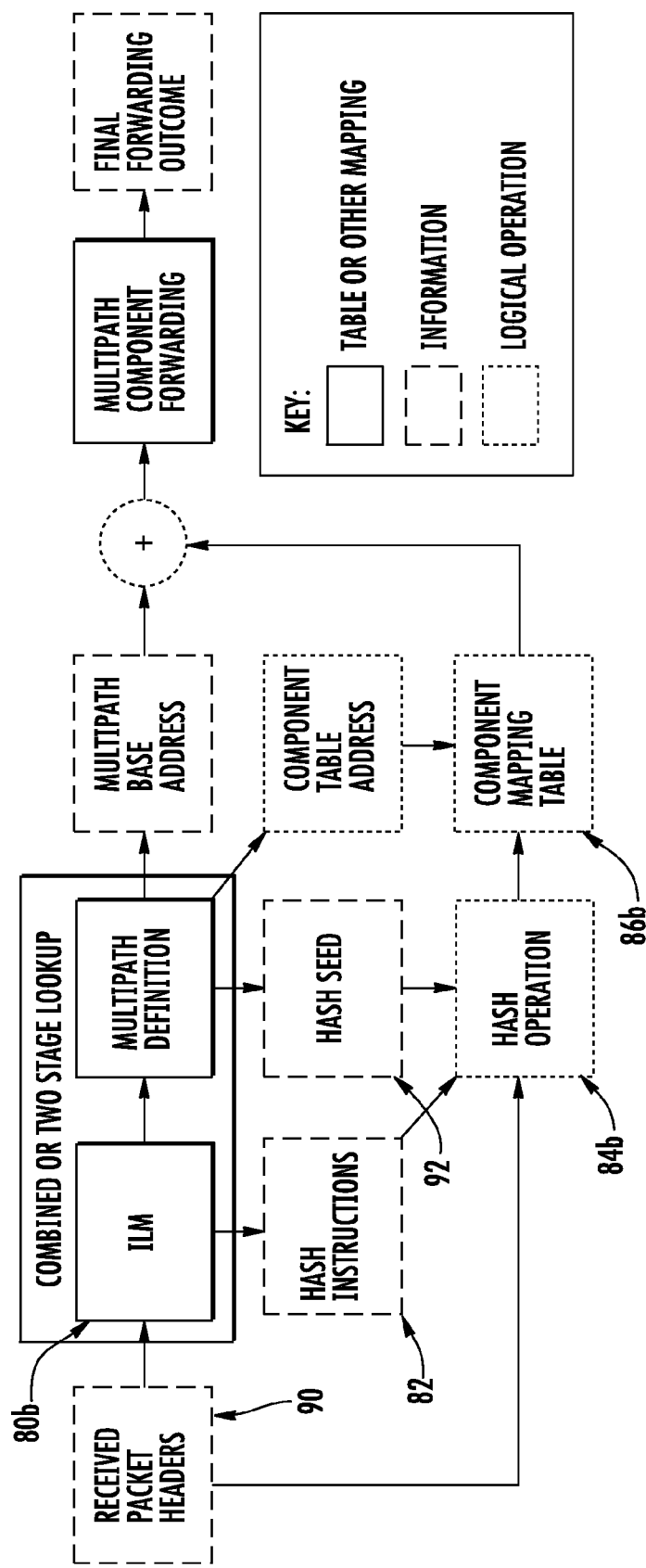
FIG. 11 illustrates a logic flow similar to that in FIG. 10, but having been modified to support the inventive concept disclosed herein.

FIG. 11 provides a block diagram depicting an exemplary circuit with modifications to implement the inventive concept disclosed herein. A block 82 labeled "Hash Instructions" has been added. The hash instructions 82 determine which portions of the received packet headers are used by the load distribution method, a hash operation in this example.

Existing packet processor designs can be modified to include the inventive concept disclosed herein. To do so requires the following changes.

In the example, the hash instructions 82 comprise a set of information derived from the requirements to retain packet ordering for aggregates at some encapsulation layer. In the example, this information is held in the ILM 80b, though it could be held in a separate data structure that is also indexed using the MPLS label. The derived information, the hash instructions 82 are available as an output to the ILM lookup in the example and are an input to the hash operation 84b. The derived information held by a specific implementation would depend on the multipath load distribution technique being used, but are derived from the requirements to maintain traffic ordering of the traffic aggregate and the contained traffic aggregates as outlined previously.

The load distribution is modified, but only in the packet header fields that can be applied to the load distribution algorithm. In the example, a hash operation is used in the load distribution. In FIG. 10 the inputs to the hash operation are received packet headers 90 and a hash seed 92. In FIG. 11 the inputs to the hash operation are the packet headers 90, a hash seed 92, and the hash instructions 82. In this example, the received packet headers 90 may be the packet headers 50, 60, and/or 70. In FIG. 10, in the absence of the inventive concept disclosed herein, any hash instructions 82 would be globally configured, and would be applied to all LSP. In FIG. 11, with the inventive concept disclosed herein, the hash instructions 82 support an ability to limit encapsulation depth. As previously noted, hash instructions 82 are selected per containing LSP (top label stack entry) with the inventive concept disclosed herein, using the ILM 80b as illustrated in FIG. 11.

Although only a few embodiments have been described in detail above, those of ordinary skill in the art will readily appreciate that many modifications are possible without materially departing from the teachings of the present disclosure. Accordingly, such modifications are intended to be included within the scope of the present disclosure as defined in the claims.

The invention claimed is:

1. A method, comprising:
at a first node in a packet network, forwarding packets over a multipath to a second node in the packet network, where the multipath includes at least one of multiple links and lower layer paths connecting the first node to the second node, wherein the packets belong to a first type of traffic aggregate, a second type of traffic aggregate and a third type of traffic aggregate, wherein:
a. For each packet that belongs to the first type of traffic aggregate requiring that all packets be forwarded in the order received, forward the packet over the same component link or component lower layer path as all other packets belonging to the same traffic aggregate;
b. for packets that belong to the second type of traffic aggregate for which ordering is not required, but includes one or more contained traffic aggregate to be forwarded in the order received and with the one or more contained traffic aggregates being identified by one or more encapsulation layers, forward the packets over a set of at least one of component links and component lower layer paths within the multipath by limiting the use of information at or below a highest encapsulating layer; and
c. for each packet that belongs to the third type of traffic aggregate for which ordering is not required, and being absent of one or more contained traffic aggregate, forward each packet such that traffic is distributed over a set of at least one component link and lower layer path of the multipath and such that packets for a micro flow are forwarded in the order received.

2. The method of claim 1, wherein in step b. the one or more encapsulation layers are within a label stack, and wherein the second type of traffic aggregate makes use of multiprotocol label switching.

3. The method of claim 1, wherein in step b., the contained traffic aggregate within the second type of traffic aggregate makes use of multiprotocol label switching-transport profile.

4. The method of claim 1, wherein in step b. the packets are forwarded with the aid of a hash algorithm utilizing only a portion of the encapsulation layers within the label stack.

* * * * *